United States Patent
Tsukamoto et al.

(10) Patent No.: US 7,587,266 B2
(45) Date of Patent: Sep. 8, 2009

(54) COLLISION OBJECT DETERMINATION DEVICE

(75) Inventors: Hiroshi Tsukamoto, Tokyo (JP); Noboru Takahashi, Tokyo (JP); Hiroshi Suganuma, Tokyo (JP); Emi Kawamura, Tokyo (JP); Satoru Inoue, Tokyo (JP); Ryoutarou Suzuki, Tokyo (JP)

(73) Assignees: Fuji Jukogyo Kabushiki Kaisha, Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 506 days.

(21) Appl. No.: 11/397,932

(22) Filed: Apr. 5, 2006

(65) Prior Publication Data
US 2006/0272391 A1 Dec. 7, 2006

(30) Foreign Application Priority Data
Apr. 6, 2005 (JP) ............................. P2005-110274

(51) Int. Cl.
*B60R 21/0136* (2006.01)
*B60R 21/00* (2006.01)
*B60R 21/34* (2006.01)
(52) U.S. Cl. .................................. 701/45; 340/436
(58) Field of Classification Search .................. None
See application file for complete search history.

(56) References Cited

U.S. PATENT DOCUMENTS

| | | | |
|---|---|---|---|
| 6,330,500 B1 | 12/2001 | Moriyama et al. | |
| 6,516,278 B1 | 2/2003 | Ishizaki et al. | |
| 6,784,792 B2 * | 8/2004 | Mattes et al. | 340/436 |
| 6,929,282 B1 * | 8/2005 | Zoratti et al. | 280/735 |
| 2004/0002815 A1 * | 1/2004 | Ishizaki et al. | 701/300 |
| 2004/0059487 A1 * | 3/2004 | Lich et al. | 701/45 |
| 2006/0064219 A1 * | 3/2006 | Murakami et al. | 701/45 |

FOREIGN PATENT DOCUMENTS

| | | |
|---|---|---|
| DE | 100 45 698 A1 | 5/2001 |
| EP | 0 982 199 A1 | 3/2000 |
| JP | 5-241537 | 9/1993 |

(Continued)

OTHER PUBLICATIONS

"Master Services of Providers", Nikkei Personal Computing, Japan, Nikkei Business Publications, Inc., Jul. 13, 1998, No. 317, pp. 236-239.

(Continued)

*Primary Examiner*—Michael J. Zanelli
(74) *Attorney, Agent, or Firm*—McGinn IP Law Group, PLLC

(57) ABSTRACT

A vehicle speed calculating section calculates the vehicle velocity by integration of a forward and reverse acceleration of a vehicle. A first deforming speed calculating section calculates a first deforming speed by integration of acceleration from a first acceleration sensor. A second deforming speed calculating section calculates a second deforming speed by integration of acceleration from a second acceleration sensor. A first deforming speed correcting section subtracts a vehicle speed from the first deforming speed and outputs it to a determining section. A second deforming speed correcting section subtracts the vehicle speed from the second deforming speed and outputs it to the determining section. In the determining section, the collision object determination is made on the basis of the corrected deforming speed.

4 Claims, 13 Drawing Sheets

FOREIGN PATENT DOCUMENTS

| | | | |
|---|---|---|---|
| JP | 5-274375 | | 10/1993 |
| JP | 6-187381 | | 7/1994 |
| JP | 9-259250 | | 10/1997 |
| JP | 2002-36995 | * | 2/2002 |
| JP | 2002-127867 | | 5/2002 |
| JP | 2002-137711 | * | 5/2002 |

OTHER PUBLICATIONS

Nishimura, Yutaka, et al., "AL-Mail is Superior in Ease of Setting: A Useful Function of Changing-Over Among a Plurality of Addresses, If Any," Nikkei Personal Computing, Japan, Nikkei Business Publications, Inc., Apr. 7, 1997, No. 286, pp. 134-135.

European Search Report dated Oct. 19, 2007.

* cited by examiner

EFFECT OF DECELERATION OF VEHICLE IS SMALL

EFFECT OF DECELERATION OF VEHICLE IS LARGE

AFTER CORRECTION

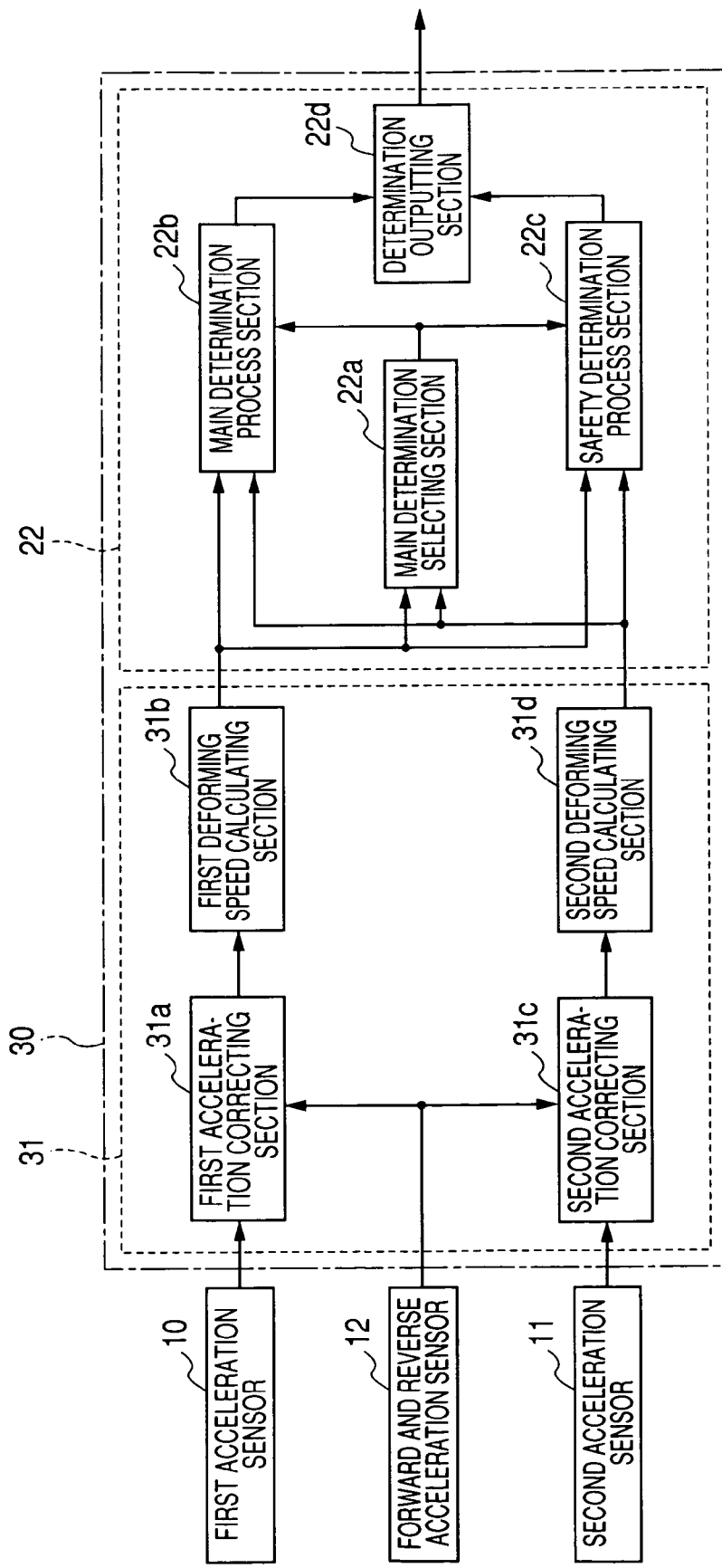

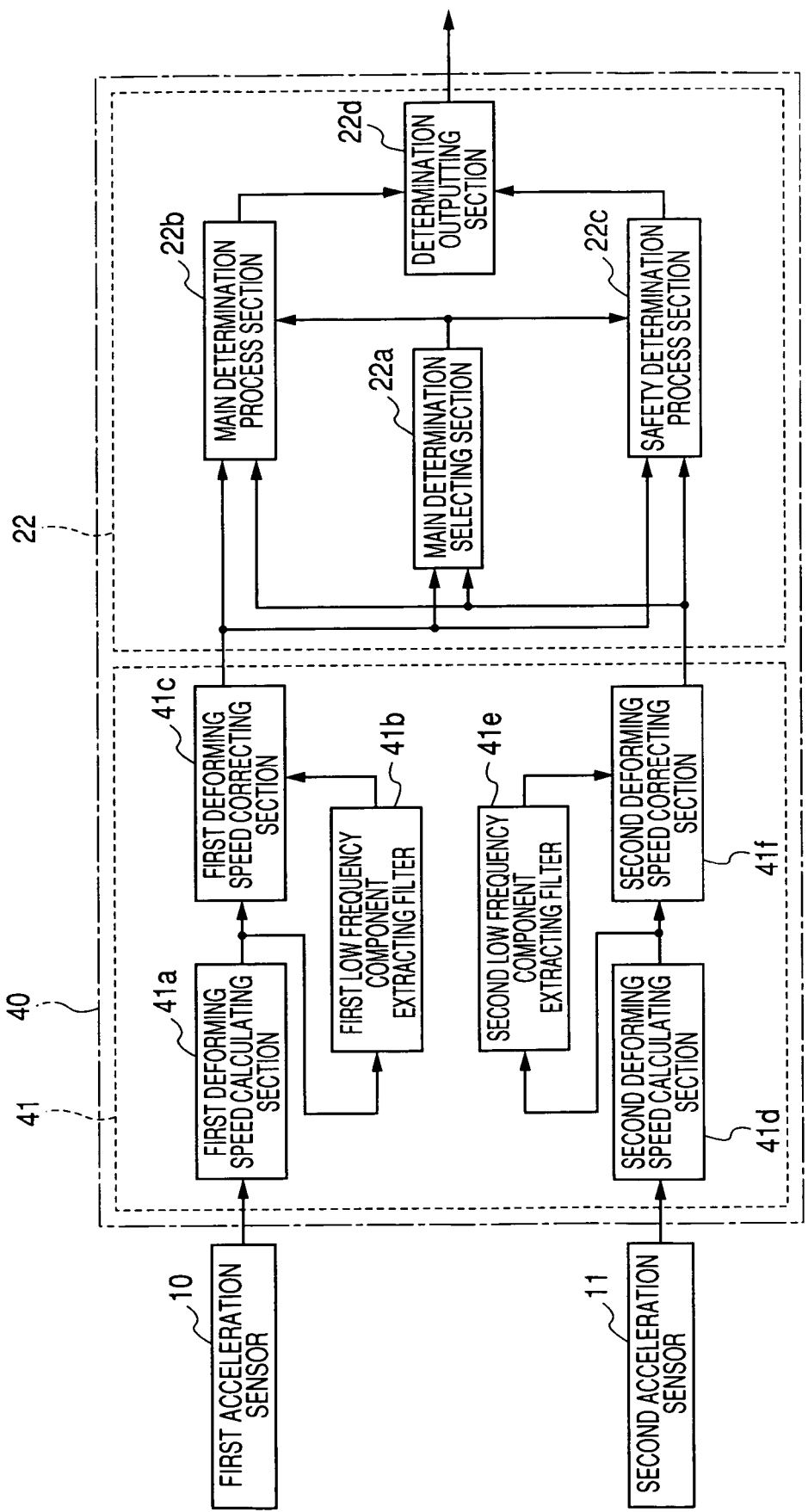

COLLISION OBJECT DETERMINATION DEVICE

The present application claims foreign priority based on Japanese Patent Application No. P.2005-110274, filed on Apr. 6, 2005, the contents of which are incorporated herein by reference.

BACKGROUND OF THE INVENTION

1. Field of the Invention

The present invention relates to a collision object determination device of a vehicle for determining collided obstructions, especially, pedestrians or the like.

2. Related Art

Recently, various safety measures of a vehicle including a safety measures of an inside space of the vehicle has been taken into consideration. Specifically, a device for effectively protecting a pedestrian when a collision between the vehicle and the pedestrian occurred has been proposed. In the device for protecting the pedestrian, the device must first be able to accurately determine whether the collision object is a pedestrian or not.

For example, in JP-A-2002-127867, a technology is disclosed in which a plurality of acceleration sensors are provided in an inner surface of a bumper face of a front bumper in the width direction of the vehicle, and the collision object is determined by processing signals from the acceleration sensor in a controller. Specifically, the determination process is performed, using a fact that a ratio of a maximum value of an amount of deformation with respect to a maximum value of a deforming speed is smaller when a collision object that is smaller than a particular collision object, such as a pedestrian. That is, if an acceleration exceeds a predetermined threshold value, a time period is set. Then, a gate, during a term from a time when the deforming speed fall below a threshold value after the deforming speed exceeds the threshold value and reaches a maximum value to a time when the time period is expired, is set. During the term, a signal at a state in which the amount of displacement is within a predetermined width is generated. Then, a signal is generated due to an AND condition of the signal and the gate, and the corrosion with the pedestrian is determined on the basis of the signal.

However, in JP-A-2002-127867, since the acceleration sensors is provided at the bumper, when the collision is occurred during a vehicle speed reduction, deceleration generated in the vehicle by the speed reduction is also detected in addition to the deforming acceleration of the bumper. Due to this, there is a problem that, even though the collision object is same, output values of the acceleration sensor are different between cases that the vehicle is in the speed reduction and in a constant speed. Therefore, a precise determination of the collision object cannot be made. In addition, without being limited by driving at a reduced speed, even if driving is accelerated during a collision, the output value thereof is made to be different from the output value when the vehicle is in the constant speed.

SUMMARY OF THE INVENTION

One or more embodiments of the present invention provide a collision object determination device which is capable of precisely determining a collision object by precisely detecting a deforming situation of a deformable member of a front bumper without being affected by acceleration and deceleration situations.

In accordance with one or more embodiments of the present invention, a collision object determination device is provided with: setting means for setting a determination amount on the basis of an acceleration of a deformable member which is deformed due to an impact at a time of vehicle collision; correcting means for correcting the determination amount by removing an effect of an acceleration of a vehicle body; and determining means for determining an object collided with the deformable member on the basis of the determination amount corrected by correcting means.

Further, in accordance with one or more embodiments of the present invention, the determination amount may be a deforming speed of the deformable member. The determining means may be provided with: deformation amount calculating means for calculating an amount of initial deformation from a reference value of the deforming speed on the basis of the deforming speed corrected by the correcting means, the reference value being previously set at a collided portion of the deformable member; return amount calculating means for calculating a return amount of deformation after being initially deformed as a return amount of deformation, on the basis of the deforming speed corrected by the correcting means; and collision object determining means for determining the object collided with the collision part according to the amount of deformation and the return amount of deformation.

Further, in accordance with one or more embodiments of the present invention, the correcting means may perform the correction on the basis of the acceleration of the vehicle body, the acceleration of the vehicle body being detected by a vehicle forward and reverse acceleration detecting means provided at a portion other than the deformable member.

Further, in accordance with one or more embodiments of the present invention, the correction means may subtract a previously set low frequency component from the determination amount, and may use the determination amount subtracted the low frequency component as the determination amount after correction.

Further, in accordance with one or more embodiments of the present invention, the correcting means may extract only a previously set high frequency component of the determination amount, and may use the extracted high frequency component as the determination amount after correction.

In the collision object determination device according to one or more embodiments of the present invention, it is possible to precisely determine the collision object by precisely detecting a deforming situation of the deformable member of the front bumper without being affected by the acceleration and deceleration of a vehicle body.

Other aspects and advantages of the invention will be apparent from the following description and the appended claims.

BRIEF DESCRIPTION OF THE DRAWINGS

FIG. 10 is a functional block diagram of a collision object determination device according to a second exemplary embodiment of the present invention.

FIG. 11 is a functional block diagram of a collision object determination device according to a third exemplary embodiment of the present invention.

DETAILED DESCRIPTION OF THE EXEMPLARY EMBODIMENTS

Exemplary embodiments of the invention will be described with reference to the accompanying drawings.

First Exemplary Embodiments

Figure 1:
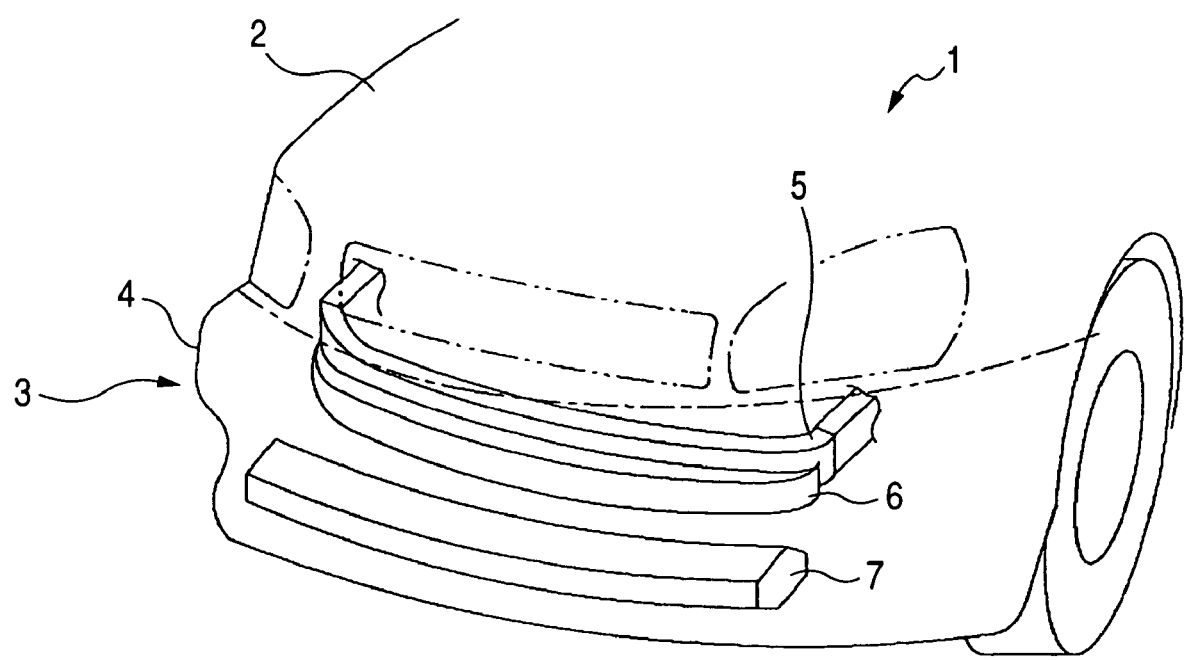
FIG. 1 is a structural view illustrating a front bumper of a vehicle according to a first exemplary embodiment of the present invention.
Figure 2:
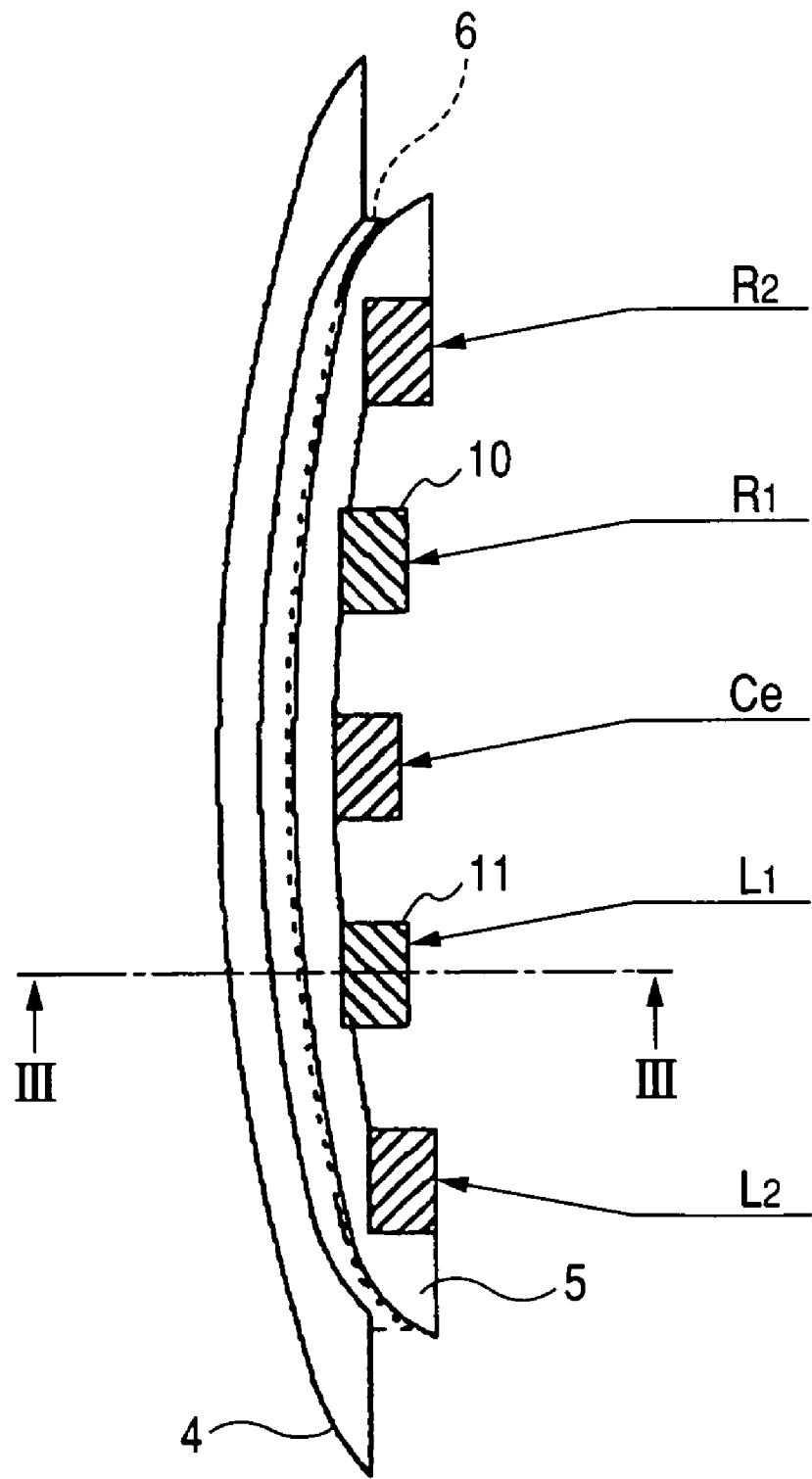
FIG. 2 is a plane view illustrating an attachment position of an acceleration sensor according to the first exemplary embodiment of the present invention.
Figure 3:
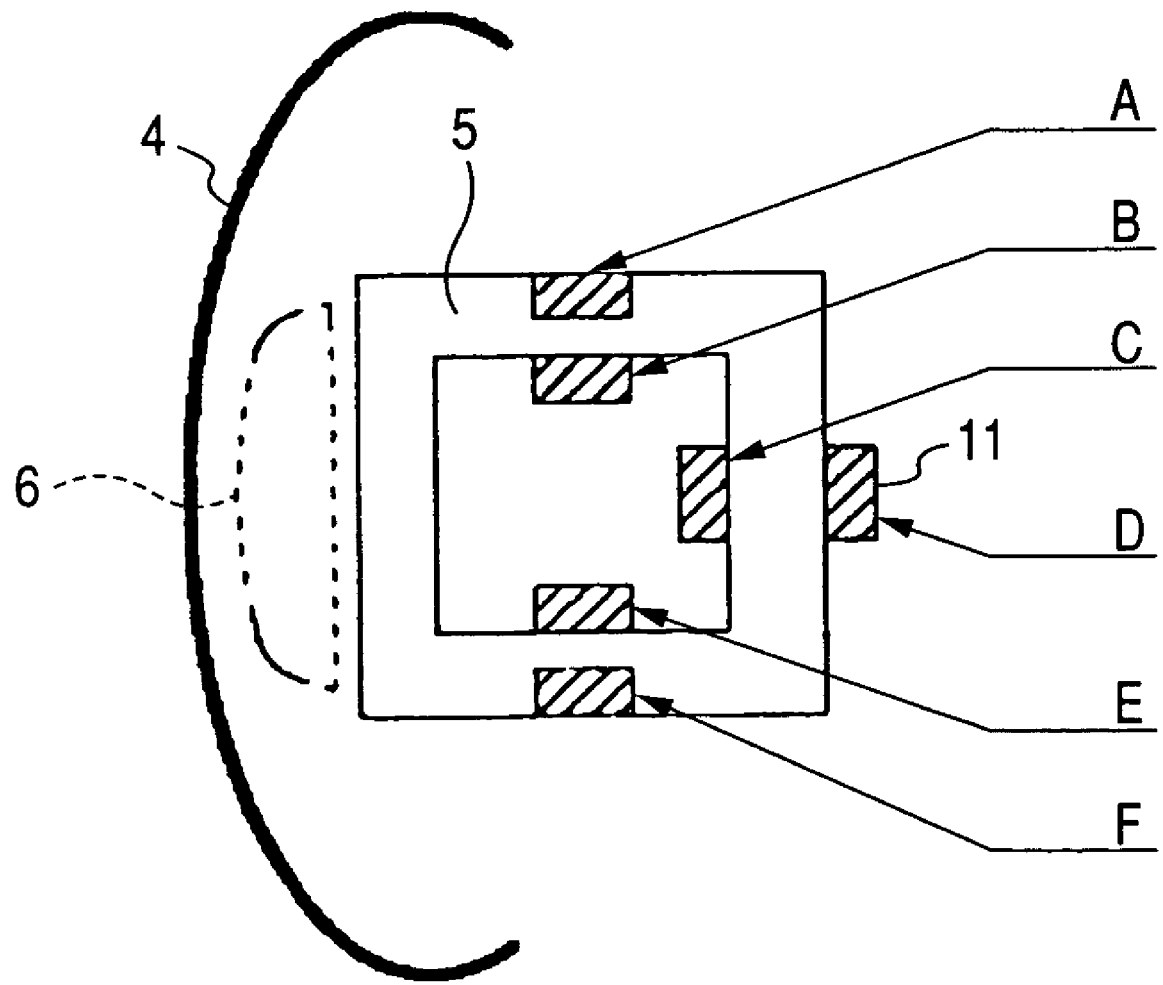
FIG. 3 is a sectional view taken along the line III-III in FIG. 2 according to the first exemplary embodiment of the present invention.
Figure 4:
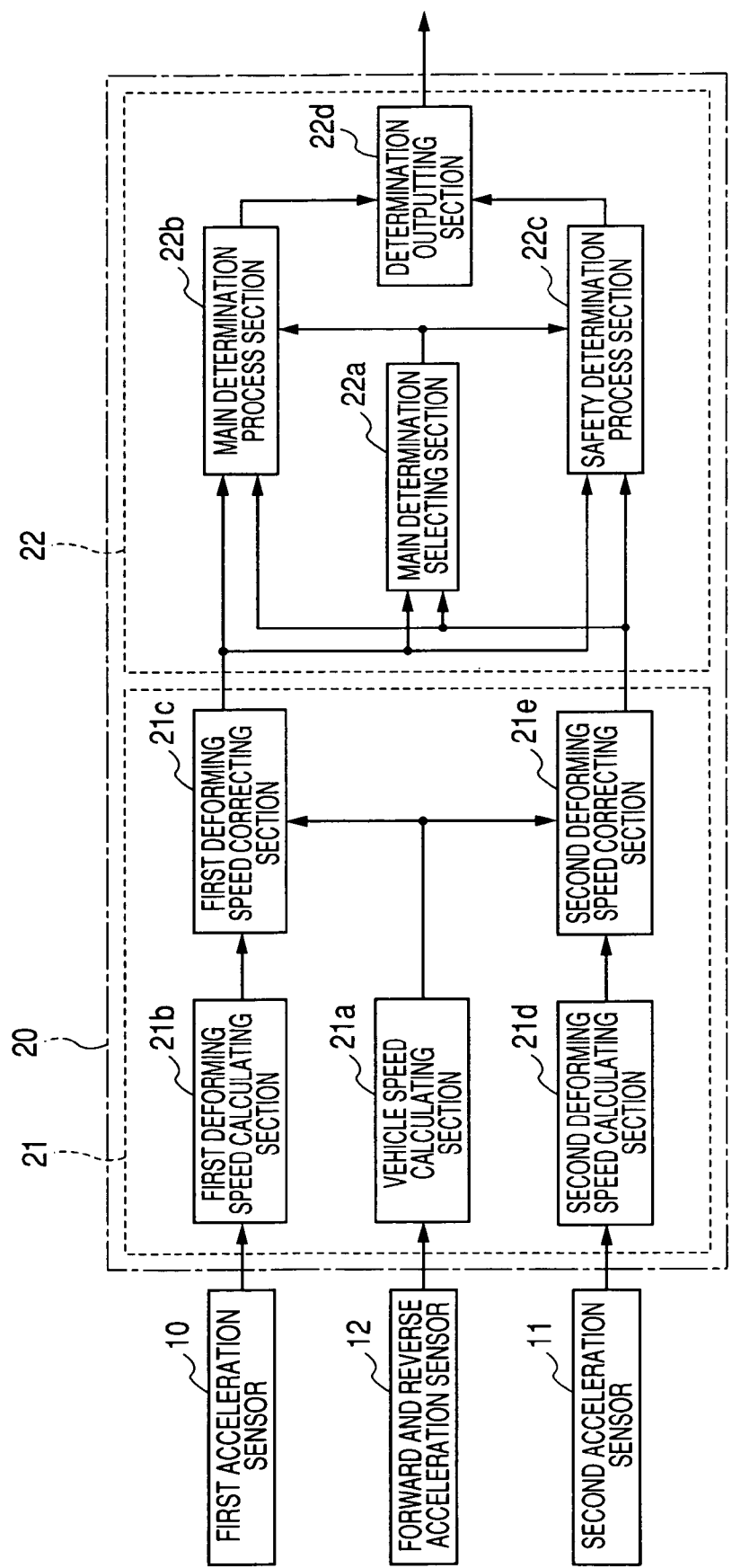
FIG. 4 is a functional block diagram of a collision object determining section according to the first exemplary embodiment of the present invention.
Figure 5:
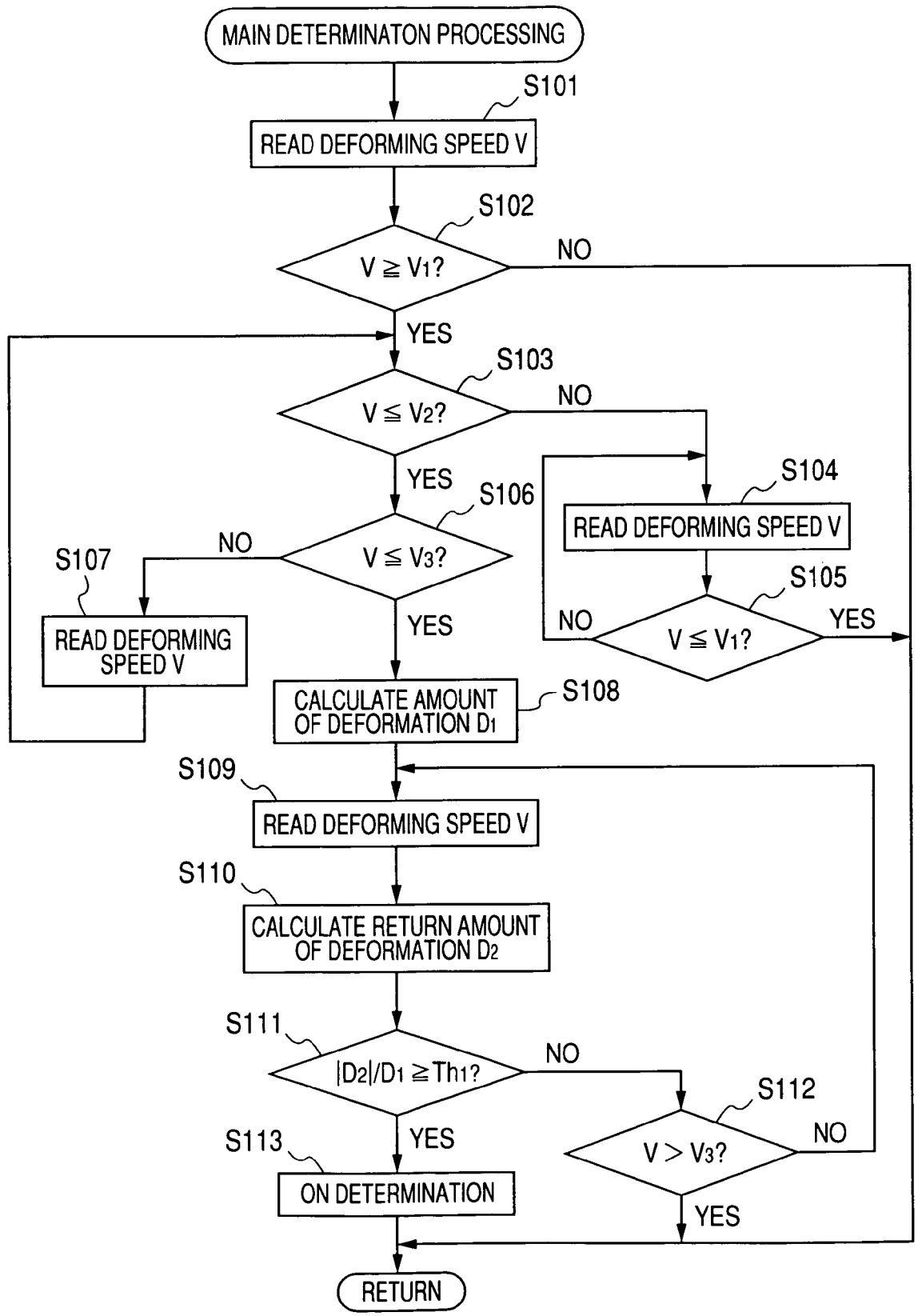
FIG. 5 is a flowchart of a main determination processing according to the first exemplary embodiment of the present invention.
Figure 6A:
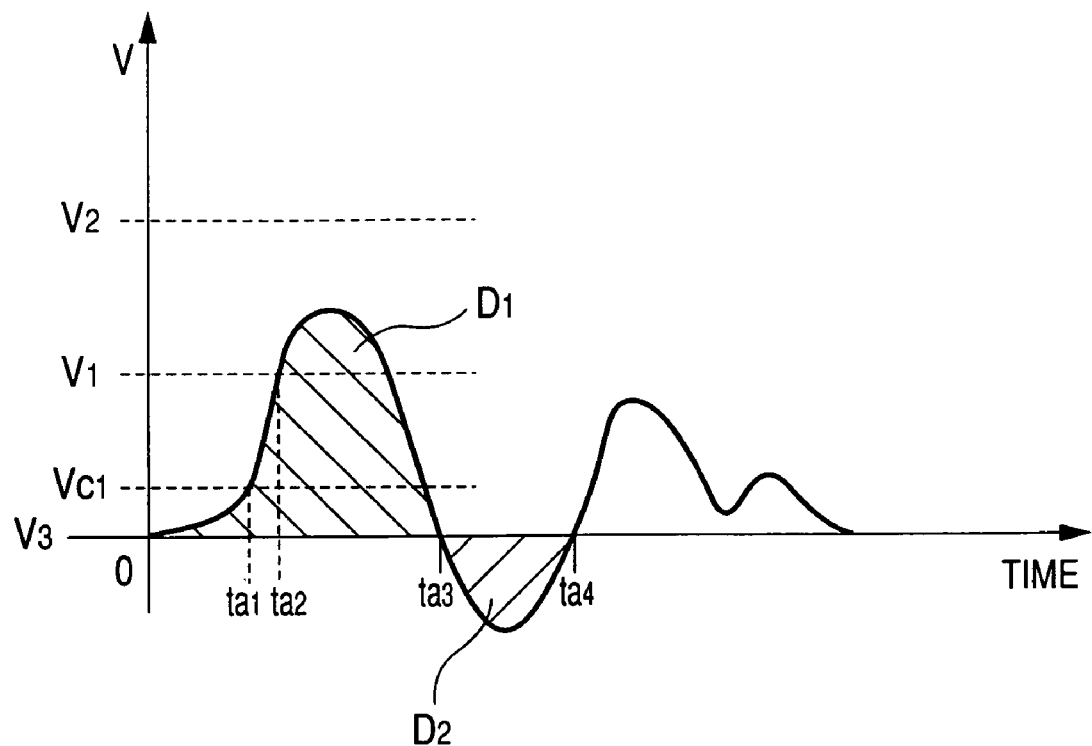
FIGS. 6A and 6B are time charts illustrating examples of the main determination process according to the first exemplary embodiment of the present invention.
Figure 6B:
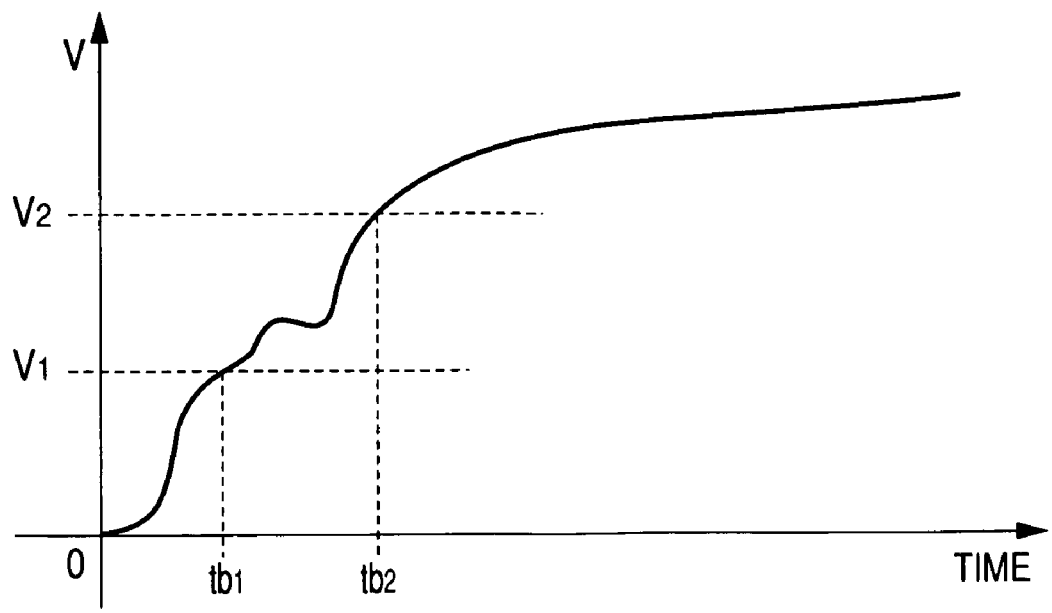
Figure 7:
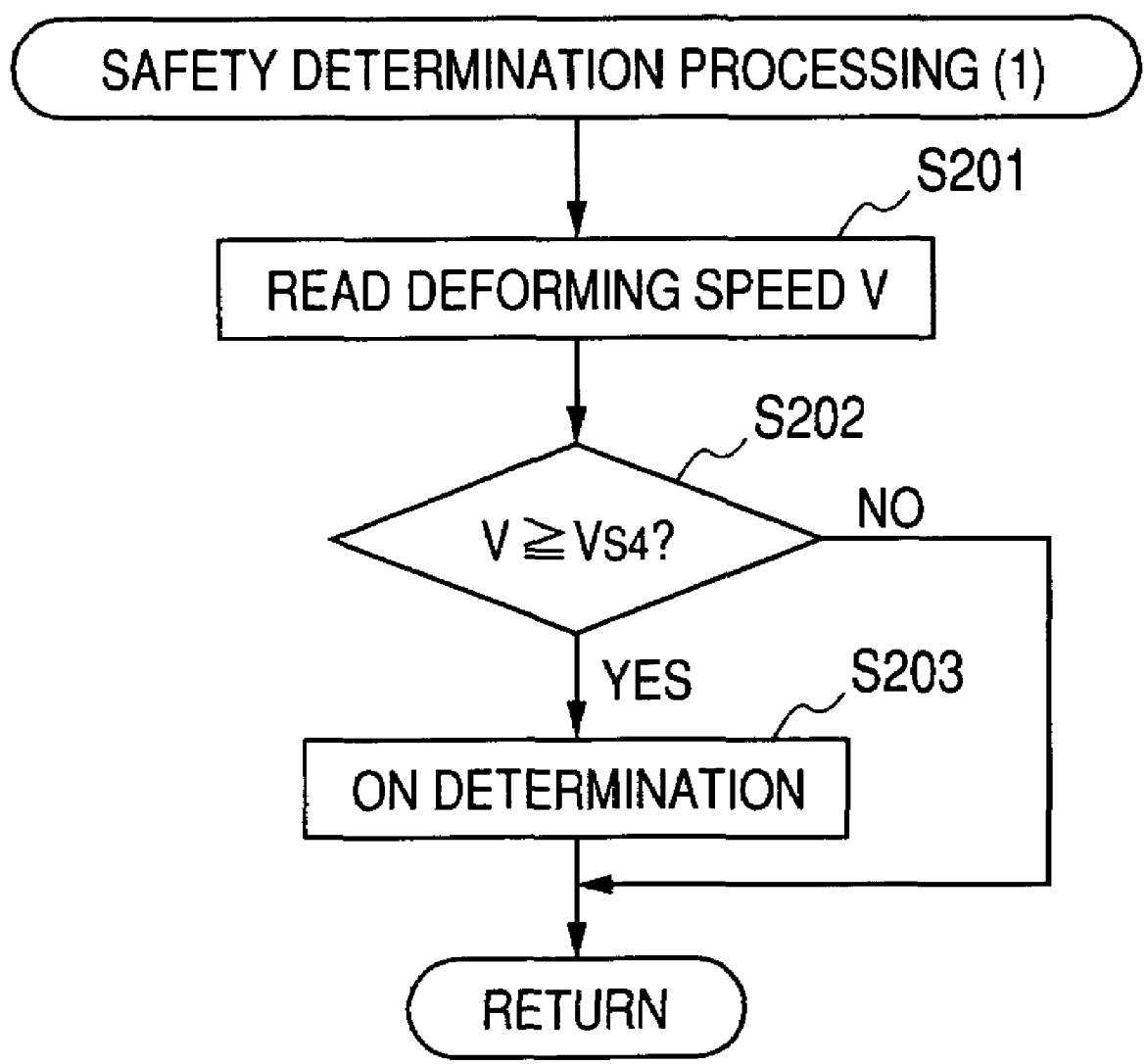
FIG. 7 is a flow chart of a safety determination processing (1) according to the first exemplary embodiment of the present invention.
Figure 8:
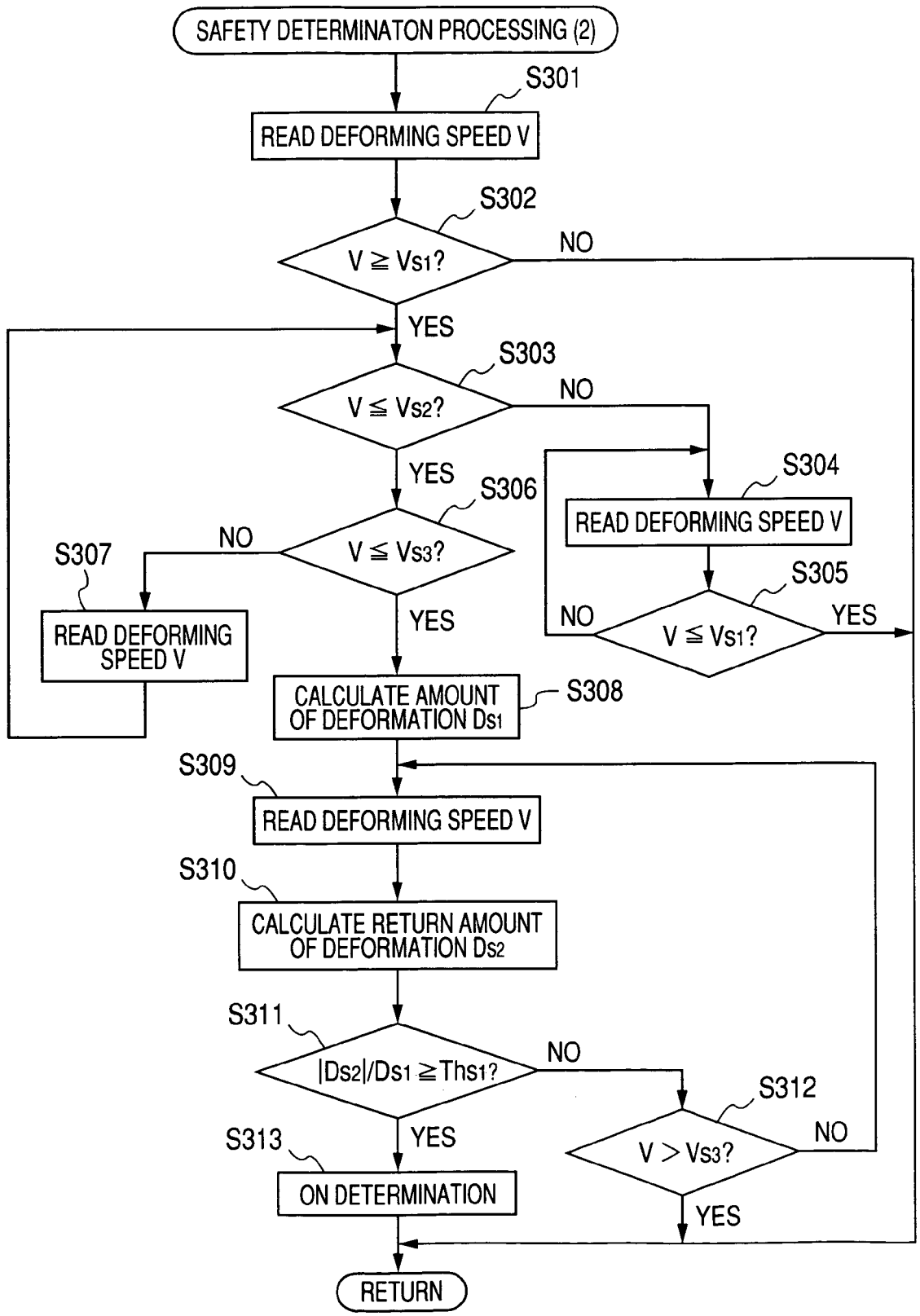
FIG. 8 is a flow chart of a safety determination processing (2) according to the first exemplary embodiment of the present invention.
Figure 9A:
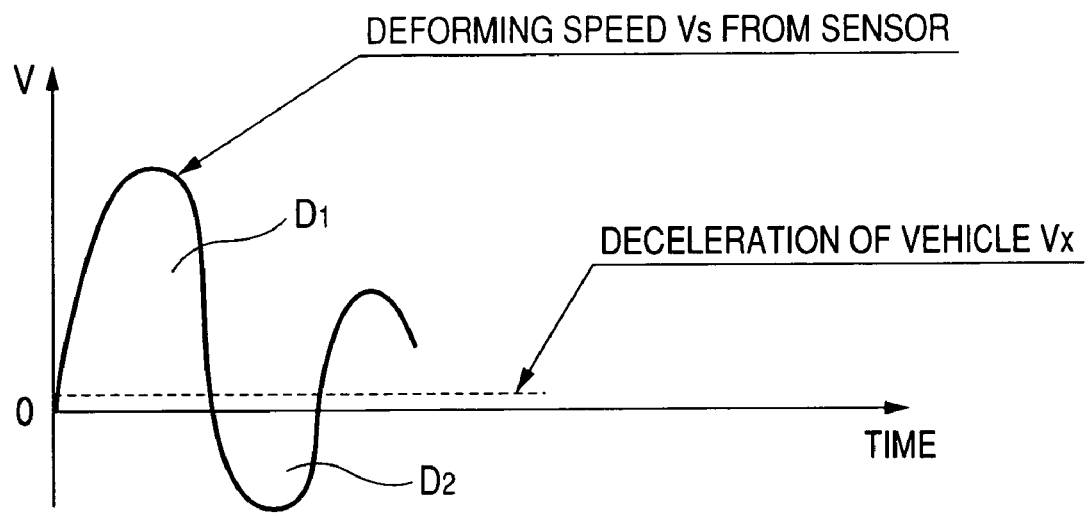
FIGS. 9A to 9C are explanatory views illustrating effects of corrections based on deforming speeds according to the first exemplary embodiment of the present invention.
Figure 9B:
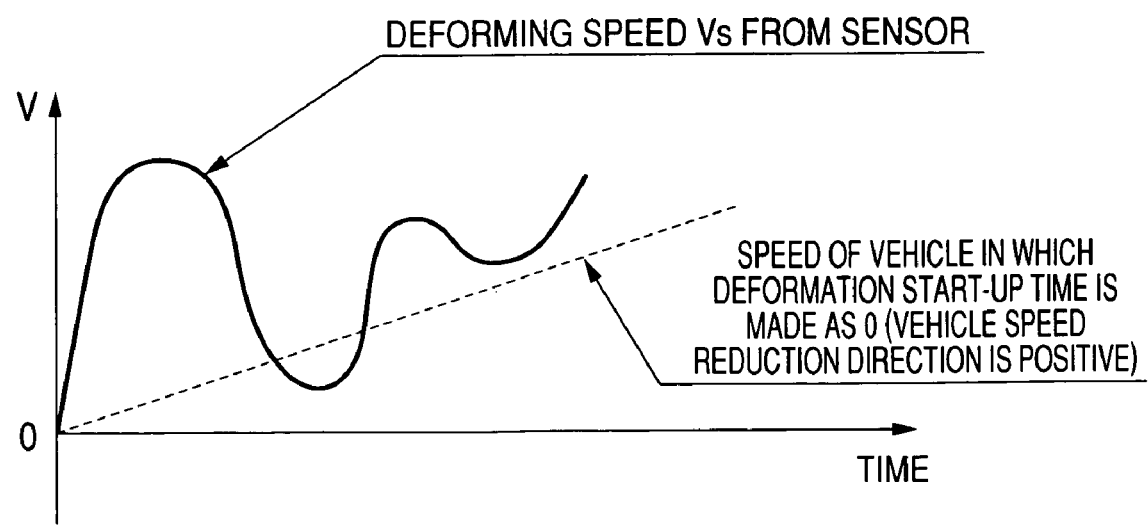
Figure 9C:
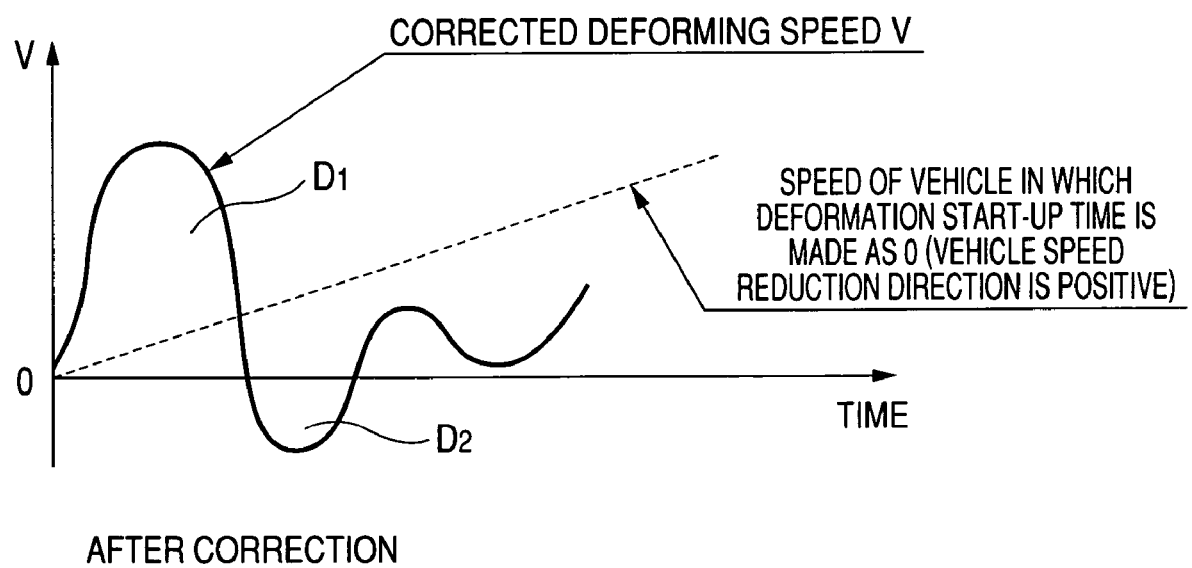

FIGS. 1 to 9C illustrate a first exemplary embodiment of the present invention. FIG. 1 is a structural view illustrating a front bumper of a vehicle, FIG. 2 is a plane view illustrating an attachment position of an acceleration sensor, FIG. 3 is a sectional view taken along the line III-III in FIG. 2, FIG. 4 is a functional block diagram of a collision object determining section, FIG. 5 is a flow chart of a main determination processing, FIGS. 6A and 6B are time charts illustrating an example of the main determination process, FIG. 7 is a flow chart of a first safety determination processing (1), FIG. 8 is a flow chart of a second safety determination processing (2), and FIGS. 9A to 9C are explanatory views illustrating effects of correction process on a deforming speed.

In FIG. 1, a reference numeral 1 denotes a vehicle, and a front bumper 3 is disposed at the lower side of a front end of a front hood 2 of the vehicle. The front bumper 3 includes a bumper face 4 made of resin, which forms an exterior cover, and a hollow bumper beam 5 made of aluminum alloy, which extends in the width direction of the vehicle. The bumper 5 is fixedly attached to a vehicle body frame (not shown), and its shape and strength are designed so that it backlashes in a direction in which its shape returns to its original shape due to its elasticity if collision occurs with a pedestrian.

Further, at a front side of the bumper beam 5, an impact absorption member 6 is interposed between the bumper beam 5 and the bumper face 4, and a lower side reinforcing member 7 is provided to extend in the width direction of the vehicle at the lower side of the impact absorption member 6.

As shown in FIG. 2, a first acceleration sensor 10 and a second acceleration sensor 11 are disposed at position R1 (for example, a right side position located at a distance of 200 mm from a central position of the vehicle) of a back surface of the bumper beam 5 in the width direction of the vehicle and at position L1 (for example, a left side position located at a distance of 200 mm from the central position of the vehicle). Further, the first and second acceleration sensors 10 and 11 are disposed at position D in FIG. 3 in the longitudinal direction, that is, at a rear outer surface of the bumper beam 5.

In the present exemplary embodiment, two acceleration sensors of the first and second acceleration sensors 10 and 11 are used, but a plurality of sensors may be used. In this case, for example, when three acceleration sensor are used, they may be provided at a position Ce (the central position of the vehicle), a position R2 (for example, a right side position located at a distance of 400 mm from the central position of the vehicle), and a position L2 (for example, a left side position located at a distance of 400 mm from the central position of the vehicle). Further, in the case of using four acceleration sensors, they may be provided at positions R1 and R2, and positions L1 and L2 in the width direction of the vehicle. In other words, the acceleration sensors may be provided at left and right side corresponding positions with respect to the center of the vehicle. Further, when a safety determination process section 22c, to be described bellow, is not provided, one acceleration sensor 1 may instead be provided at the position Ce (the central position of the vehicle) shown in FIG. 2.

Further, in the present exemplary embodiment, the first and second acceleration sensors 10 and 11 are provided at the position D shown in FIG. 3, that is, at the rear outer surface of the bumper 5, but they may be provided at a portion other than one portion facing the front portion of the bumper face 4 of the front bumper 3, that is, at a position excluding the front inner and outer surfaces of the bumper 5. For example, the first and second acceleration sensors 10 and 11 may be provided at any one of position A (an upper outer surface), position B (an upper internal surface), position C (a rear internal surface), position E (lower internal surface), and position F (lower outer surface).

As shown in FIG. 4, the first and second acceleration sensors 10 and 11 are connected to the collision object determining section 20, respectively, and input acceleration signals of the bumper beam 5 to the collision object determining section 20.

Further, a forward and reverse acceleration sensor 12 serving as a forward and reverse acceleration detecting means for detecting the forward and reverse acceleration of the vehicle is provided inside a center console (not shown) of the vehicle and is connected to the collision object determining section 20.

The forward and reverse acceleration sensor 12 can detect the acceleration of the vehicle without being affected by the deformation caused by a collision, and it may be provided at the back of a vehicle (trunk of vehicle) or may be provided in vehicle body having any buffering member being disposed therebetween. Further, the forward and reverse acceleration sensor 12 may be replaced with one which differentiates and inputs signals from a vehicle speed sensor generally disposed in a vehicle.

As shown in FIG. 4, the collision object determining section 20 is mainly composed of a deforming speed setting section 21 functioning as the setting means and the correcting means, and a determining section 22 functioning as the determining means.

The deforming speed setting section 21 is mainly composed of a vehicle speed calculating section 21a, a first deforming speed calculating section 21b, a first deforming speed correcting section 21c, a second deforming speed calculating section 21d, and a second deforming speed correcting section 21e.

The vehicle speed calculating section 21a is provided with a forward and reverse acceleration Gx of the vehicle output from the back and fourth acceleration sensor 12, and the vehicle speed calculating section 21a calculates a vehicle speed Vx by integration of this forward and reverse acceleration Gx. Further, the calculated vehicle speed Vx is output to the first and second deforming speed correcting sections 21c and 21e.

In the first exemplary embodiment, the vehicle speed Vx is calculated by integration of the forward and reverse acceleration Gx input from the forward and reverse acceleration sensor 12, but the vehicle speed Vx may be obtained using a known wheel speed sensor, for example.

The first deforming speed calculating section 21b is input with an acceleration Gs1 output from the first acceleration sensor 10 and calculates a first deforming speed Vs1 by integration of the acceleration Gs1. Further, the calculated first deforming speed Vs1 is output to the first deforming speed correcting section 21c.

The first deforming speed correcting section 21c is provided with a vehicle speed Vx output from the vehicle speed calculating section 21a and the first deforming speed Vs1 output from the first deforming speed calculating section 21b. Further, the first deforming speed correcting section 21c subtracts the vehicle speed Vx from the first deforming speed Vs1 to offset the first deforming speed Vs1 due to the vehicle speed Vx and outputs the corrected first deforming speed Vs1 to the determining section 22.

The second deforming speed calculating section 21d is provided with the acceleration Gs2 output from the second acceleration sensor 11 and calculates a second deforming speed Vs2 by integration of the acceleration Gs2. Then, the calculated second deforming speed Vs2 is output to the second deforming speed correcting section 21e.

The second deforming speed correcting section 21e is provided with the vehicle speed Vx output from the vehicle speed calculating section 21a and the second deforming speed Vs2 output from the second deforming speed calculating section 21d. Further the second deforming speed correcting section 21e subtracts the vehicle speed Vx from the second deforming speed Vs2 to offset the second deforming speed Vs2 due to the vehicle speed Vx and outputs the corrected second deforming speed Vs2 to the determining section 22.

In this way, in the first exemplary embodiment, the determination amount is a deforming speed. In the deforming speed setting section 21, the first and second deforming speed calculating sections 21b and 21d are provided as the setting means, and the vehicle speed calculating section 21a, the first and second speed correcting sections 21c and 21e are provided as the correcting means.

The determining section 22 is mainly composed of a main determination selecting section 22a, a main determination process section 22b, the safety determination process section 22c, and a determination outputting section 22d The main determination selecting section 22a is input with the first and second deforming speeds Vs1 and Vs2 output from the deforming speed setting section 21, and compares these signals to select a larger signal as the signal to be processed by the main determination process section 22b (for example, select the deforming speed reaching faster to a threshold value Vc1 (shown in FIG. 6A previously obtained by experiment, calculation or the like), outputs the selected signal to the main determination process section 22b. Further, the main determination selecting section 22a selects a smaller signal as a signal to be processed by the safety determination process section 22c, and outputs the selected signal to the safety determination process section 22c. This is performed since the signal from a sensor provided at the collision side becomes large, such that the deforming speed also becomes large, in case of an offset collision or an oblique collision, especially.

In the first exemplary embodiment, the deforming speeds are compared and are selected either as a signal to be used in the main determination process section 22b or as a signal to be used in the safety determination process section 22c. However, the acceleration from the first and second acceleration sensors 10 and 11 may be compared to determine which side is large, and a larger signal may be selected as a signal to be processed in the main determination process section 22b. In this case, the values output from the first and second acceleration sensors 10 and 11 may be used as it is, or may be compared after being subtracted the value of acceleration detected at the forward and reverse acceleration sensor 12.

Further, in case where three acceleration sensors or more are provided, a value obtained from a sensor in which the acceleration is largest or a value of the deforming speed obtained from a sensor in which the speed is largest is used as the value to be used in the main determination process section 22b. Further, a value of the deforming speed obtained from a sensor adjacent to the sensor used in the main determination process section 22b is selected as the value to be used in the safety determination process section 22c.

The main determination process section 22b reads in the deforming speed selected at the main determination selecting section 22a, and determines whether a collision object is a pedestrian (ON determination) or not according to a main determination processing, to be described bellow. The signal determined by the main determination process section 22b is output to the determination outputting section 22d.

In other words, as shown in a flow chart of FIG. 5, first, the signal of the deforming speed (the larger deforming speed V) selected at the main determination selecting section 22a is read in at step 101 (S101).

Then, the processing proceeds to S102, the deforming speed V and a first speed threshold value V1 previously set by experiment, calculation or the like. When the deforming speed V is lower than the first speed threshold value V1, the processing stops as it is (corresponding to time ta1 to ta2 of FIG. 6A: FIGS. 6A and 6B are views showing a speed in the direction of deformation as a positive value).

From the result of the determination at S102, when the deforming speed V is larger than the first speed threshold value V1, the processing proceeds to S103, and the deforming speed V and a second speed threshold value V2 previously set by experiment, calculation or the like are compared to each other.

From the result of the determination at S103, when the deforming speed V is larger than the second speed threshold value V2, the processing proceeds to S104 to read in the new deforming speed V, and the processing proceeds to S105.

At S105, the deforming speed V and the first speed threshold value V1 are compared to each other. When the deforming speed V is not smaller than the first speed threshold value V1, processing returns to S104. When the deforming speed V is smaller than the first speed threshold value V1, the processing stops. In other words, in case of colliding with a pedestrian, an amount of deformation in the direction of backlash against an amount of deformation in the direction of deformation increases. However, in case of colliding with a heavy object, as shown in FIG. 6B, the deformation is made so that the deforming speed exceeds the second speed threshold value V2 (at time tb2), it is determined that the collision object is not a pedestrian.

On the other hand, at the above-described S103, when the deforming speed V is smaller than the second speed threshold value V2, the processing proceeds to S106, it is determined whether the deforming speed V is smaller than a reference value V3 (for example, 0 Km/h) of the deforming speed previously set by experiment, calculation or the like.

From the result of the determination at S106, when the deforming speed V is larger than the reference value V3, the processing proceeds to S107 to read in the new deforming speed V and returns to S103 (it corresponds to time ta2 to ta3 in FIG. 6A.

From the result of the determination at S106, when the deforming speed V is smaller than the reference value V3, the processing proceeds to S108. At S108, the deforming speed V is integrated to calculate an amount of deformation D1.

Then, the processing proceeds to S109 to read the new deforming speed. Then, the processing proceeds to S110. At S110, a return amount of deformation from deforming speed to the reference value V3 of the deforming speed at present point of time, that is, a return amount of the return deformation D2 is calculated by integration, and the processing proceeds to S111.

A ratio of the return amount of deformation D2 to the amount of deformation D1 (|D2|/D1) and a first ratio threshold value Th1 previously set by experiment, calculation or the like are compared at S111.

From the result of the comparison at S111, when the ratio of the return amount of deformation D2 to the amount of deformation D1 (|D2|/D1) is smaller than the first ratio threshold value Th1, the processing proceeds to S112. At S112, it is determined whether the deforming speed V is larger or not larger than the reference value V3. When the deforming speed V is larger than the reference value V3, the processing stops to terminate the calculation of the return amount of deformation D2. On the contrary, when the deforming speed V is smaller than the reference value V3, processing returns to S109.

From the result of the comparison at S111, when the ratio of the return amount of deformation D2 to the amount of deformation D1 (|D2|/D1) is larger than the first ratio threshold value Th1, the processing proceeds to S113. At S113, the ON determination (it is determined that the collision object is a pedestrian) is made and the processing stops.

In other words, as shown in FIG. 6, in the case of colliding with a pedestrian, the ratio of the return amount of deformation D2 to the amount of deformation D1 (|D2|/D1) increases. On the contrary, in case of colliding with a heavy object, the deforming speed V exceeds the second speed threshold value V2, or the return amount of deformation D2 does not appear (the deforming speed V is not smaller than the reference value V3). Even though the deforming speed V is smaller than the reference value V3, the amount of deformation D1 is large and the ratio with respect to the return amount of deformation D2 is very small. Therefore, this difference is discriminated, such that it is possible to reliably determine the collision with the pedestrian.

In the first exemplary embodiment, the main determination process section 22b does not directly use the deforming speed V, the amount of deformation D1, and the return amount of deformation D2, as the value of determination for determining the collision with the pedestrian, but instead performs the determination by using the ratio of the return amount of deformation D2 to the amount of deformation D1 (|D2|/D1). Therefore, the main determination process section 22b can determines exactly the collision with a pedestrian under any colliding speed without being influenced by the variation of the colliding speed with a good response.

Further, since the calculation can be simply performed by obtaining the ratio of the return amount of deformation D2 to the amount of deformation D1 (|D2|/D1) and comparing it with the first ratio threshold value Th1, it is possible to reduce an amount of calculation and the number of calculation elements. Therefore, it is possible to decrease the threshold value to be set, and to quickly adjust to any situation in which there are changes in specifications, such as various front bumper.

As described above, the main determination process section 22b functions as the deformation amount calculating means, the return amount calculating means, and the collision object determining means.

The safety determination process section 22c reads in the signals of the deforming speed of a side selected by the main determination selecting section 22a and, in the present exemplary embodiment, determines that the result of the determination at the main determination process section 22b is output or not according to a safety determination processing to be described bellow. In other words, when the output of the resultant determination is allowed, an ON determination is performed. Further, the determination signal of the safety determination process section 22c is output to the determination outputting section 22d.

Signals from the main determination process section 22b and the safety determination process section 22c are input to the determination outputting section 22d. Then, when both the signals from the main determination process section 22b and the safety determination process section 22c are ON determination, the determination outputting section determines that it has collision with a pedestrian and outputs signal thereof.

Next, the safety determination processing (1) performed at the safety determination process section 22c will be described with reference to the flow chart of FIG. 7.

First, at S201, the deforming speed V of a side selected at the main determination selecting section 22a is read in.

Then, the processing proceeds to S202, the deforming speed V and a third speed threshold value Vs4 previously set by an experiment, a calculation, or the like are compared at S202. When the deforming speed V is smaller than the third speed threshold value Vs4, the processing stops as it is. On the contrary, the deforming speed V is larger than the third speed threshold value Vs4, the processing proceeds to S203. At S203, ON determination is performed to permit the output of the determination result at the main determination process section 22b and then proceeds to stop. In this way, as the confirmation processing is performed by the safety determination process section 22c, it is possible to improve the degree of precision of the determination.

In the case where a plurality of acceleration sensors is provided, when the entire deforming speed V by the sensor adjacent to the sensor per forming the main determination process is larger than a fourth speed threshold value previously set by experiment, calculation or the like, the ON determination may be performed. One of the adjacent acceleration sensors has a value larger than the third speed threshold value Vs4 previously set by experiment, calculation or the like, the ON determination may be of course performed. This difference is decided by a speed threshold value setting method.

Further, the determination process of the above-described safety determination processing (1) may be performed by the next safety determination processing (2). The safety determination processing (2) is performed by changing each of the threshold values of the above-described main determination processing (1).

FIG. 8 illustrates a flowchart of the safety determination processing (2). First, at S301, a signal of the deforming speed of a side selected at the main determination selecting section 22a (a smaller side deforming speed V) is read in.

Then, the processing proceeds to S302. At S302, the deforming speed V is compared with a fifth speed threshold value Vs1 smaller than the above-described first speed threshold value V1. When the deforming speed V is smaller than the fifth speed threshold value Vs1, the processing stops as it is.

From the result of the determination S302, when the deforming speed V is larger than the fifth speed threshold value Vs1, the processing proceeds to S303. At S303, the deforming speed V is compared with a sixth speed threshold value Vs2 smaller than the second speed threshold value V2 previously set by experiment, calculation or the like.

From the result of the determination S303, when the deforming speed V is larger than the sixth speed threshold value Vs2, the processing proceeds to S304. At S304, the new deforming speed V is read in, and the processing proceeds to S305.

At S305, the deforming speed V and the fifth speed threshold value Vs1 are compared with each other. When the deforming speed V is not smaller than the fifth speed threshold value Vs1, the processing returns to S304 and when the deforming speed V is smaller than the fifth speed threshold value, the processing stops.

On the other hand, at the above-described S303, when the deforming speed V is smaller than a sixth speed threshold value Vs2, the processing proceeds to S306. At S306, it is determined whether the deforming speed V is smaller than a reference value Vs3 of the deforming speed, which is previously set by experiment, calculation or the like (for example, 0 Km/h, which is the same value as the above-described reference value V3).

Form the result of the determination at S306, when the deforming speed V is larger than the reference value Vs3, the processing proceeds to S307. At S307, the new deforming speed is read in and the processing returns to S303.

From the result of the determination at S306, the deforming speed V is lower than the reference value Vs3, the processing proceeds to S308. At S308, the deforming speed is integrated and the amount of deformation D1 is calculated.

Then, the processing proceeds to S309 to read in the new deforming speed V and then proceeds to S310. At S310, the return amount of deformation from deforming speed to the reference value Vs3 of the deforming speed at present point of time, that is, the return amount of return of deformation D2 is calculated by integration, and the processing proceeds to S311.

Then, the ratio of the return amount of deformation D2 to the amount of deformation D1 (|D2|/D1) and a second ratio threshold value Ths1 smaller than the first ratio threshold value Th1, which is previously set by experiment, calculation or the like are compared at S311.

From the result of the comparison at S311, when the ratio of the return amount of deformation D2 to the amount of deformation D1 (|D2|/D1) is smaller than the second ratio threshold value Ths1, the processing proceeds to S312. At S312, it is determined whether the deforming speed V is larger than the reference value Vs3 or not. When the deforming speed V is larger than the reference value Vs3, the processing stops to terminate the calculation on the return amount of deformation D2. On the contrary, the deforming speed V is smaller than the reference value Vs3, processing returns to S309.

From the result of the comparison at S311, when the ratio of the return amount of deformation D2 to the amount of deformation D1 (|D2|/D1) is larger than the second ratio threshold value Ths1, the processing proceeds to S313. At S312, the ON determination is made to permit the output of the result of the determination at the main determination process section 22b and the processing stops.

In case where a plurality acceleration sensors is provided, similar to the above-described description at the safety determination processing (1), when the entire deforming speed V by the sensor adjacent to the sensor performing the main determination process is larger than a third ratio threshold value smaller than the above-described first ratio threshold value, which is previously set by experiment, calculation or the like, the ON determination may be made. One of the adjacent acceleration sensors has a value larger than the second ratio threshold value Ths1 previously set by experiment, calculation or the like, the ON determination may be of course made. This difference is decided by a ratio threshold value setting method.

Further, in the determination process of the above-described safety determination processing (1) or (2), ON determination may be made when the amount of deformation obtained by integration of the acceleration (a value corrected by reducing the acceleration of the vehicle) from the first and second acceleration sensors 10 and 11 or the deforming speed (a value corrected by reducing the speed of the vehicle) exceeds the threshold value previously set.

Further, the safety determination process section 22c restricts the main determination process at the main determination process section 22b within a predetermined time, and when it exceeds the time, the determination about the collision may not be performed. For example, a determination gate is generated for a predetermined time after the deforming speed V exceeds V1/2, and when the processing is terminated within the gate, the determination on the collision (ON determination) is not performed.

As described above, according to the first exemplary embodiment, as the safety determination process section 22c and the determination process section 22d are provided, such that it is possible to improve the degree of precision. Further, in case where the decrease in the amount of calculation is taken seriously and a sufficient degree of precision is obtained by only the main determination process section 22b, the safety determination process section 22c and the determination outputting section 22d may be omitted.

Further, according to the first exemplary embodiment, since the correction is made by an offset by subtracting the vehicle speed from the deforming speed used as the amount of deformation, the determination on the collision can be precisely made by precisely detecting only the deforming speed. In other words, as shown in FIGS. 9A to 9C, in case of the collision during the speed reduction drive of the vehicle, the acceleration sensor attached at the bumper detects also a deceleration generated by the speed reduction drive of the vehicle in addition to the deforming acceleration at which the bumper is deformed. Therefore, in cases of collision during the speed reduction drive and a constant speed drive, even though the collision object is same at both cases, the collision object determination cannot be precisely made since the output values are different in both the cases. For example, when the effect of the deceleration of the vehicle is small, as shown in FIG. 9A, only the deforming speed of the bumper is detected, such that a satisfied determination can be made. However, when the effect of the vehicle is large, as shown in FIG. 9B, the deceleration of the vehicle and the deforming speed of the bumper are mixed, such that it is impossible to detect the true deforming speed due to the collision. Therefore, in the first exemplary embodiment, as shown in FIG. 9C, the correction is made through the offset by subtracting the vehicle speed from the deforming speed used as the amount of determination, such that the true deforming speed of the deformed member can be detected, whereby the determination on the collision object can be precisely made.

Second Exemplary Embodiments

Next, FIG. 10 is a functional block diagram of the collision object determination device according to a second exemplary embodiment of the present invention. In the second exemplary embodiment, only the method of correcting the deforming speed in the deforming speed setting section of the collision object determination section is different, and the other construction and operation are same as those of the first exemplary embodiment, such that the same members are denoted by the same reference numerals, and the description thereof will be omitted.

In FIG. 10, a reference numeral 30 indicates a collision object determining section, according to the second exemplary embodiment, mainly composed of a deforming speed setting section 31 functioning as the setting means and the correcting means, and the determining section 22 functions as the determining means.

The deforming speed setting section 31 is mainly composed of a first acceleration correcting section 31a, a first deforming speed calculating section 31b, a second acceleration correcting section 31c, and a second deforming speed calculating section 31d.

The first acceleration correcting section 31a is provided with the forward and reverse acceleration Gx from the forward and reverse acceleration sensor 12 and the acceleration Gs1 output from the first acceleration sensor 10. Further, the correction on the deforming speed at the stage of acceleration value is made by subtracting the forward and reverse acceleration Gx of the vehicle from the acceleration Gs1.

The first deforming speed calculating section 31b is provided with the corrected acceleration from the first acceleration correction section 31a, calculates the first deforming speed Vs1 by integration of the acceleration, and outputs the calculated deforming speed to the determining section 22.

The second acceleration correcting section 31c is provided with the forward and reverse acceleration Gx from the forward and reverse acceleration sensor 12 and the acceleration Gs2 output from the second acceleration sensor 11. Further, the correction on the deforming speed at the stage of acceleration value is made by subtracting the forward and reverse acceleration Gx of the vehicle from the acceleration Gs2.

The second deforming speed calculating section 31d is provided with the corrected acceleration from the second acceleration correction section 31c, calculates the second deforming speed Vs2 by integration of the acceleration, and outputs the calculated deforming speed to the determining section 22.

As described above, the deforming speed setting section 31 according to the second exemplary embodiment, the first and second acceleration correcting sections 31a and 31c are provided as the correcting means, and the first and second deforming speed calculating sections 31b and 31d are provided as the setting means. According to the above-described construction, it is possible to obtain the same effect as that of the first exemplary embodiment. Further, in the second exemplary embodiment, the correction is made at the stage of the acceleration, such that the integrating and calculating section can be omitted, as compared with the first exemplary embodiment (the integration processing of the forward and reverse acceleration Gx can be omitted).

Third Exemplary Embodiment

Next, FIG. 11 is a block diagram illustrating the collision object determination device according to a third exemplary embodiment. In the third exemplary embodiment, only the method of correcting the deforming speed in the deforming speed setting section of the collision object determination section is different, and the other construction and operation are same as those of the first exemplary embodiment, such that the same members are denoted by the same reference numerals, and the description thereof will be omitted.

In FIG. 11, a reference numeral 40 indicates a collision object determining section according to the third exemplary embodiment, which is mainly composed of a deforming speed setting section 41 functioning as setting means and the correcting means, and the determining section 22 functioning as the determining means. In the present exemplary embodiment, there is not provided the forward and reverse acceleration sensor 12 detecting the forward and reverse acceleration of the vehicle like the first and second exemplary embodiments.

The deforming speed setting section 41 is mainly composed of a first deforming speed calculating section 41a, a first low frequency component extraction filter 41b, a first deforming speed correcting section 41c, a second deforming speed calculating section 41d, a second low frequency component extraction filter 41e, and a second deforming speed correcting section 41f.

The first deforming speed calculating section 41a is provided with the acceleration Gs1 from the first acceleration sensor 10 and calculates the first deforming speed Vs1 by integration of the acceleration Gs1. Further, the calculated first deforming speed Vs1 is output to the first low frequency component extraction filter 41b and the first deforming speed correcting section 41c.

In the first low frequency extraction filter 41b, a previously set low frequency component is extracted from the first deforming speed Vs1 output from the first deforming speed calculating section 41a as accelerated and decelerated speed components of the vehicle body and outputs the extracted low frequency component to the first deforming speed correcting section 41c.

The first deforming speed correcting section 41c is provided with the first deforming speed Vs1 from the first deforming speed calculating section 41a and the low frequency component extracted as the accelerated and decelerated speed components from the first low frequency component extraction filter 41b. Further, the first deforming speed correction section 41c subtracts the low frequency component from the first deforming speed Vs1 to offset the first deforming speed Vs1 by the low frequency component and then outputs it to the determining section 22.

The second deforming speed calculating section 41d is provided with the acceleration Gs2 from the second acceleration sensor 11, and calculates the second deforming speed Vs2 by integration of the acceleration Gs2. Further, the calculated second deforming speed Vs2 is output to the second low frequency component extraction filter 41e and the second deforming speed correcting section 41f.

In the second low frequency component extracting filter 41e, a previously set low frequency component is extracted from the second deforming speed Vs2 output from the second deforming speed calculating section 41d as the accelerated and decelerated speed components of the vehicle body and outputs the extracted low frequency component to the second deforming speed correcting section 41f.

The second deforming speed correcting section 41f is provided with the second deforming speed Vs2 from the second deforming speed calculating section 41d and the low frequency component extracted as the accelerated and decelerated speed components from the second low frequency component extraction filter 41e. Further, the second deforming speed correction section 41f subtracts the low frequency component from the second deforming speed Vs2 to offset the second deforming speed Vs2 by the low frequency component and then outputs it to the determining section 22.

Here, according to the third exemplary embodiment, the first and second deforming speed calculating sections 41a and 41d are provided as the setting means, the first low frequency component extraction filter 41b, the first deforming speed correcting section 41c, the second low frequency component extraction filter 41e, the second deforming speed correcting section 41f are provided as the correcting means.

In other words, the accelerated and decelerated speed components are components in the low frequency band, as compared with the accelerated and decelerated speed components due to the collision, such that the accelerated and decelerated speed components can be easily extracted by using the well known low-pass filter. Therefore, according to the third exemplary embodiment, the accelerated and decelerated speed component is obtained without using the forward and reverse acceleration sensor 12, whereby it is possible to reduce the cost of the system in addition to the effect described in the first exemplary embodiment.

Fourth Exemplary Embodiment

Figure 12:
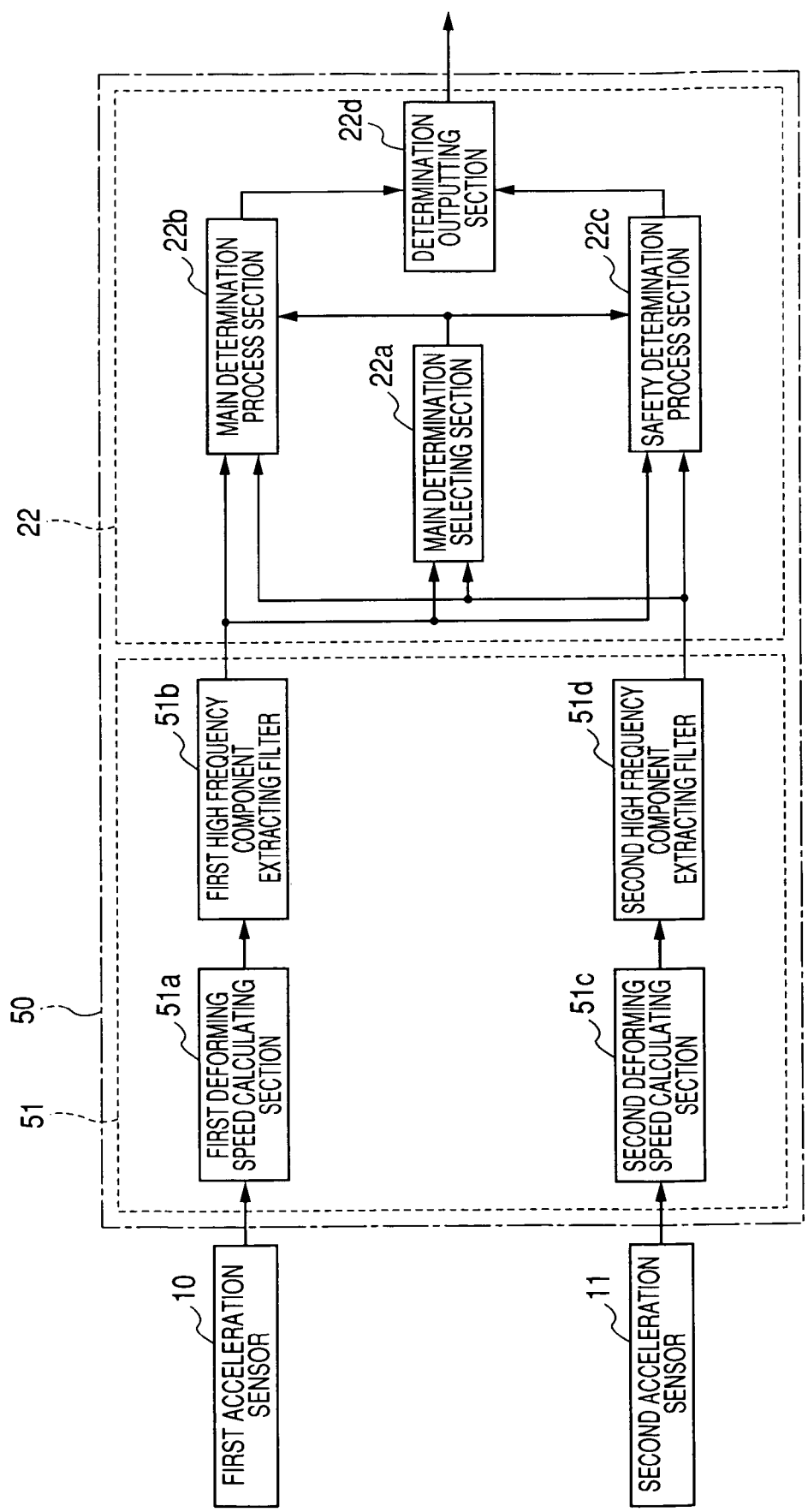
FIG. 12 is a functional block diagram of a collision object determination device according to a fourth exemplary embodiment of the present invention.

Next, FIG. 12 is a functional block diagram of the collision object determination device according to a fourth exemplary embodiment. In the fourth exemplary embodiment, only the method of correcting the deforming speed in the deforming speed setting section of the collision object determination section is different, and the other construction and operation are same as those of the first embodiment, such that the same members are denoted by the same reference numerals, and the description thereof will be omitted.

In other words, in FIG. 12, a reference numeral 50 indicates a collision object determining section according to the fourth exemplary embodiment, which is mainly composed of a deforming speed setting section 51 functioning as the setting means and the correcting means, and the determining section 22 functioning as a determining means. In the present exemplary embodiment, there is not provided the forward and reverse acceleration sensor 12 detecting the forward and reverse acceleration of the vehicle like the first and second exemplary embodiments.

The deforming speed setting section 51 is mainly composed of a first deforming speed calculating section 51a, a first high frequency component extraction filter 51b, a second deforming speed correcting section 51c, and a second high frequency component extraction filter 51d.

The first deforming speed calculating section 51a is provided with the acceleration Gs1 from the first acceleration sensor 10 and calculates the first deforming speed Vs1 by integration of the acceleration Gs1. Further, the calculated first deforming speed Vs1 is output to the first high frequency component extraction filter 51b.

In the second high frequency extraction filter 51b, a previously set high frequency component is extracted from the first deforming speed Vs1 output from the first deforming speed calculating section 51a as the deforming speed component without including the accelerated and decelerated speed components of the vehicle body and outputs the extracted high frequency component to the determining section 22.

The second deforming speed calculating section 51c is provided with the acceleration Gs2 from the second acceleration sensor 11, and calculates the second deforming speed Vs2 by integration of the acceleration Gs2. Further, the calculated second deforming speed Vs2 is output to the second high frequency component extraction filter 51d.

In the second high frequency extraction filter 51b, the previously set high frequency component is extracted from the second deforming speed Vs2 output from the second deforming speed calculating section 51c as the deforming speed component without including the accelerated and decelerated speed components of the vehicle body and outputs the extracted high frequency component to the determining section 22.

Here, according to the fourth exemplary embodiment, the first and second deforming speed calculating sections 51a and 51c are provided as the setting means, the first and second high frequency component extraction filter 51b and 51d are provided as the correcting means.

In other words, as described in the third exemplary embodiment, in the fourth exemplary embodiment is made in consideration with that the accelerated and decelerated speed components of the vehicle are components in the low frequency band compared with the accelerated and decelerated speed components due to the collision. On the contrary to the third exemplary embodiment, the deforming speed component is extracted using a well known high-pass filter or a band-pass filter set in the side of the high frequency component in consideration of removing a noise. Therefore, according to the fourth exemplary embodiment, the accelerated and decelerated speed components is obtained without using the forward and reverse acceleration sensor 12, whereby it is possible to reduce the cost of the system in addition to the effect described in the first exemplary embodiment. Further, it is unnecessary to provide the complicated circuit construction as described in the third exemplary embodiment, such that it is possible to further reduce the cost. Furthermore, since the system is made simple, whereby the system has a high general-usability, is small in size and is light in weight, and has an excellent design property.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A device for determining a collision object of a vehicle, the device comprising:

setting means for setting a determination amount on a basis of at least one of an acceleration of a deformable member which is deformed due to an impact at a time of vehicle collision and a frequency component of the acceleration;

correcting means for correcting the determination amount by removing an effect of acceleration of a vehicle body; and determining means for determining an object collided with the deformable member on the basis of the determination amount corrected by the correcting means, wherein the determination amount comprises a deforming speed of the deformable member, and wherein, the determining means comprises:

deformation amount calculating means for calculating an amount of initial deformation from a reference value of the deforming speed on the basis of the deforming speed corrected by the correcting means, the reference value being previously set at a collided portion of the deformable member;

return amount calculating means for calculating a return amount of deformation after being initially deformed as a return amount of deformation, on the basis of the deforming speed corrected by the correcting means; and collision object determining means for determining the object collided with the collision part according to the amount of deformation and the return amount of deformation.

2. The device according to claim 1, wherein the correcting means performs the correction on the basis of the acceleration of the vehicle body, the acceleration of the vehicle body being detected by a vehicle forward and reverse acceleration detecting means provided at a portion other than the deformable member.

3. The device according to claim 1, wherein the correction means subtracts a previously set low frequency component from the determination amount, and uses the determination amount subtracted by the low frequency component as the determination amount after correction.

4. The device according to claim 1, wherein the correcting means extracts only a previously set high frequency component of the determination amount, and uses the extracted high frequency component as the determination amount after correction.

* * * * *